United States Patent [19]
Wilson

[11] 3,874,888
[45] Apr. 1, 1975

[54] ROADSTONE

[75] Inventor: Arthur Wilson, Stourbridge, England

[73] Assignee: Albright & Wilson Limited, Warwickshire, England-

[22] Filed: Apr. 17, 1973

[21] Appl. No.: 351,868

Related U.S. Application Data

[63] Continuation of Ser. No. 93,456, Nov. 27, 1970, abandoned.

[30] Foreign Application Priority Data
Nov. 28, 1969 United Kingdom ............ 58319/69
Apr. 20, 1970 United Kingdom ............ 18798/70

[52] U.S. Cl. ............ 106/288 B, 106/281 R, 404/17
[51] Int. Cl. ............................................ C08h 17/04
[58] Field of Search .................... 106/281 R, 288 B

[56] References Cited
UNITED STATES PATENTS

| | | | |
|---|---|---|---|
| 3,240,615 | 3/1966 | Martinet | 106/59 |
| 3,285,761 | 11/1966 | Hare et al. | 106/59 |
| 3,607,339 | 9/1971 | Davies | 106/309 |
| 3,776,748 | 12/1973 | Richards | 106/281 |
| 3,785,842 | 1/1974 | Murray | 106/288 B |

Primary Examiner—Winston A. Douglas
Assistant Examiner—J. V. Howard
Attorney, Agent, or Firm—Herbert H. Goodman, Esq.

[57] ABSTRACT

It is known to use certain calcined minerals as roadstone. The invention provides an improved roadstone consisting of a sintered spinel preferably embedded in a softer matrix such as sintered slag. The roadstone is characterized by an improved polished stone value.

10 Claims, No Drawings

ROADSTONE

This is a continuation, of application Ser. No. 93,456, filed Nov. 27, 1970 now abandoned.

The present invention relates to improved roadstone. A variety of mineral aggregates have been employed in the construction of road surfaces. It is important that roadstone should be rough enough to provide a good frictional grip. Generally speaking the materials used hitherto have suffered from the disadvantage that they tend to wear smooth after a short period. This tendency may be measured and expressed as the polished stone value or P.S.V. of the material.

We have now discovered that a satisfactory roadstone of high P.S.V. can be manufactured by sintering minerals having a spinel crystal structure, especially the hard particulate residue, left after the chemical extraction of chromium from chrome ore. Preferably the spinels are sintered with a softer calcareous or siliceous refractory binder.

Our invnention provides a granular roadstone wherein the granules comprise particles of a spinel sintered together.

According to a preferred embodiment our invention provides a sintered roadstone comprising particles of a spinel chemcially bonded into a matrix of a softer, calcareous or siliceous, refractory binder.

AS used herein "spinel" refers to any mineral having the spinel crystal structure and a formula corresponding to $Mg\, Al_2O_4$ wherein the Mg and Al may be replaced at least partially by equivalent di- and tri-valent metals respectively. For example a typical spinel has the formula $(Mg_{(1-x)}Fe_x)(Al_{(1-y)}Cr_y)_2O_4$ where $x$ and $y$ are between 0 and 1. An example of such a spinel is chrome ore or the residue from the chemical extraction of chromates from chrome ore. The latter residue, referred to hereinafter as chrome residue, is particularly suitable for use in the present invention. Chrome residue may vary as to the proportion of calcium present which depends on the method of extraction employed. Typically the chrome is extracted by heating crushed chromite ore with alkali to form alkali bichromate which is lixiviated with water, leaving a residue comrpsing material in the spinel habit.

The spinel preferably has a particle size of from 1 mm to 400 mesh, preferably 400 to 50 mesh BS.

The binder may be a slag e.g. a pelletised slag of the type described in our copending application No. 58321/69. Suitable slags include phosphorus furnace slag, blast furnace slag, cupola slags and cooper slags. Other suitable binders include red mud from aluminium manufacture, clay, pulverised fuel ash, shale, sodium fluorosilicate, sodium silicate, olivine or other calcereous or siliceous mineral or slag which is softer and more fusible than the spinel. In some instances it may be disirable to include a flux such as calcium fluoride with the binder, however many of the binders, e.g. slags and sodium fluorosilicate, are self-fluxing.

Preferably the binder if any is crushed, for example to less than 1 mm, preferably less than 50 mesh BS, e.g. 50 mesh to 400 mesh, and mixed with the chrome residue or other spinel. The mixture may then be heated to a sintering temperature by forming a bed on a moving grate. Preferably however the spinel is moistened or slurried with water and formed into pellets, e.g. ⅛ to 1 inch in diameter, by extrusion, moist granulation, spray drying, drum drying or other suitable means, and calcined for example in a rotary kiln.

Alternatively a pumpable slurry of the spinel and binder with water may be heated directly in a rotary kiln. It is also possible to form the moist mixture into bricks using a suitable die and to bake the brick in a tunnel kiln. In the last mentioned technique it is preferred to employ a die having a rough inside surface. It is particularly preferred to employ a die which is shaped so as to impress a series of grooves or similar constrictions on the bricks, whereby each brick is subdivided into a plurality of smaller tablets, joined to each other by narrower necks, so that the bricks break up into evenly sized small tablets of e.g. one-sixteenth to 1 inch dimension on subsequent crushing.

The powder, slurry, pellets or bricks are calcined preferably at temperatures sufficient to sinter but not completely fuse the mixture e.g. e.g. to a mean dimension of from one-sixteenth to one-half inch. The product is useful for road surfacing in conjunction with a bituminous, resinous or cement binder.

Calcination is preferably effected in a rotary kiln. Combustible materials such as coke may be included in the mixture, so as to provide an internal source of heating, but preferably the heat is provided externally to the mixture by the hot gases of the kiln. This is preferred, because the presence of combustible material tends to make the product porous and hence more friable. We therefore prefer to calcine a mixture which contains insufficient combustible material to provide self-sustaining combustion. Compositions of the invention may contain hard particulate material such as sand or bauxite in addition to chrome residue. Preferably the chrome residue constitutes from 10 to 90 percent by weight of the roadstone composition e.g. 30 to 80% by weight.

The roadstone composition may be obtained in a variety of desirable colours by suitable variation of the chrome content and the conditions of calcination. Generally lower proportions of chrome residue give rise to green coloured products, higher proportions to black product. Longer calcination and higher temperatures produce darker colours from a given composition.

The invention is illustrated by the following examples:

EXAMPLE I

Chrome residue of less than 200 mesh BSS (3 parts by weight was mixed with phosphorus furnace slag round to less than 100 mesh (1 part by weight). The mixture was formed with pellets of 1½ inch diameter and fired 1,200° to 1,250°C. The product had a P.S.V. of 87.

EXAMPLE 2

Chrome residue of less than 200 mesh (3 parts by weight) was mixed with ground 100 mesh soda glass (1 part by weight) and fired at 1080. The product has a P.S.V. of 70.

We claim:

1. An improved composition for surfacing roads consisting essentially of roadstone granules and a paving binder selected from the group consisting of bitumen, resin binders, and cement, the improvement comprising utilizing as said roadstone granules, non-fused granules having a mean dimension of from one-sixteenth inch to one-half inch and consisting essentially of particles of a mineral having the spinel crystal structure of a particle size of 1 mm to 400 mesh British Sieve Series, said particles being sintered together to form said granules.

2. The composition of claim 1 wherein said particles of a mineral are chrome residue.

3. The composition of claim 1, wherein said particles of a mineral forming said granules are embedded in a softer refractory matrix, said matrix being selected from the group consisting of clay, shale, sodium fluorosilicate, red mud, fuel ash, olivine, and slag.

4. The composition of claim 1, wherein said particles of a mineral forming said granules are embedded in a softer refractory matrix, and wherein said particles of a mineral constitute from 10 to 90 percent by weight of said roadstone.

5. The composition of claim 1, wherein said particles of a mineral of the spinel crystal structure are substantially non-porous.

6. The composition of claim 5, wherein said particles of a mineral of the spinel crystal structure are selected from the group consisting of chrome ore and chrome residue.

7. The composition of claim 1 wherein said binder is bitumen.

8. The composition of claim 2 wherein said binder is bitumen.

9. The composition of claim 3 wherein said binder is bitumen.

10. The composition of claim 4 wherein said binder is bitumen.

* * * * *